April 11, 1961  A. B. FOGLE  2,979,146
STORAGE BATTERY BOX CLAMPS
Filed May 5, 1959

INVENTOR
ARNOLD B. FOGLE
BY
ATTORNEY

United States Patent Office 2,979,146
Patented Apr. 11, 1961

2,979,146
STORAGE BATTERY BOX CLAMPS

Arnold B. Fogle, 705 Miller Ave., Box 25, Shelbyville, Ind.

Filed May 5, 1959, Ser. No. 811,088

8 Claims. (Cl. 180—68.5)

This invention relates to an improved universal hold-down clamp for batteries, and is an improvement over my Patent No. 2,216,663 to meet the present day changes in the sizes of batteries; and to work universally with the various automobile support devices of our present day motor vehicle construction.

Manufactures of automobiles and other motor vehicles do not use a standard supporting base or carriage for the different battery sizes. Various types of bases and means for bolting the battery in place are provided, not overlooking the fact that various sizes of batteries are also used. Solid type of battery frames were originally used in production by the manufacturer of new motor vehicle equipment. When replacement of the solid hold-down frames become necessary, it is difficult for the parts suppliers to stock all the various sizes and types of clamps.

It is the main object of this invention to relieve this problem by making a battery clamp so universally constructed that it can be used to replace most all the various size original clamps which have become worn.

Now, another improvement in this invention, over and above U.S. Patent No. 2,216,663, is to improve and simplify the construction, cutting cost in its manufacture, as well as making the clamp easier to be fitted, adjusted and installed in a short time to various types of batteries and base supports.

The clamp, as described in Patent No. 2,216,663, was packed in the container unassembled, and had to be assembled by the user for whatever size battery it was used on. This took time of the vendor and added cost to the installation. One of the purposes in this invention is to construct the universal clamp so that it can be assembled and packed in the carton, ready for use with a minimum of assembly of the parts.

Some of the present motor car manufacturers have lowered the bolt fastening rods below the level of the top of the battery. The construction of the clamp, Patent No. 2,216,663, will not work on this particular type battery carrying device. The improvements of this invention overcome this difficulty.

It will be noted in Patent No. 2,216,663, the bolts were securely fastened to a sleeve which held the adjoining slidable parts of the frame together. This fastening means has been improved by forming a pocket on the sleeve as a receptacle for the angle bolting plate which allows the angle bolting plate to be easily removed and placed in the pocket of any sleeve around the frame. In constructing the sleeve with the pocket, it will be shown how the angle bolting plate will fit into the pocket for either above level of battery bolting or below level of battery bolting, by placing it in the pocket upside down or top side up. It will be seen that the removable angle bolting plate is provided with legs to be bent or formed over as hooks to hold it in place. Here again in the construction of ths angle bolting plate, improvement will be seen over other so-called conventional bolt anchors now in use as "floating" on the rim of the frame of the hold-down without any fastening method to secure it as a permanent part of the clamp.

The purpose then of this invention is as follows: to so construct a universal battery hold-down clamp, having adjustment for both length and width of various size batteries, with parts designed to eliminate cost in manufacture; and the construction such that it will meet both above level of battery bolting means and below level bolting, whether the bolting be at the sides or ends of the battery.

The construction of the universal clamp is such that it can be assembled and packed ready to adjust over the top contour of the batteries when removed from the box; the bolting devices being so constructed as to work at either sides or ends of a battery when removed from the carton.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, wherein like reference characters indicate like parts throughout the several figures and in which:

Figure 3:
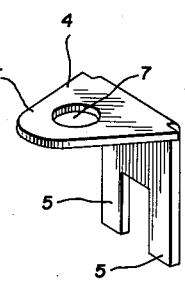
Figure 4:
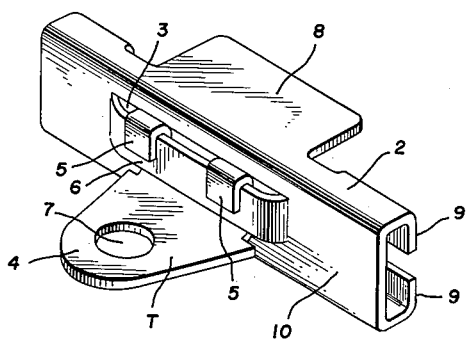

Fig. 3 is a view in perspective of an angle shaped bolting bracket having legs formed on the downward portion of the angle and a hole in the upper leg of the angle plate; and Fig. 4 is a view in perspective of the retaining clamp with the angle bracket in inverted position, and its legs assembled upward through the pocket on the retaining clamp and the legs bent downward on the outer side of the pocket, holding it in assembled position.

Figure 1:
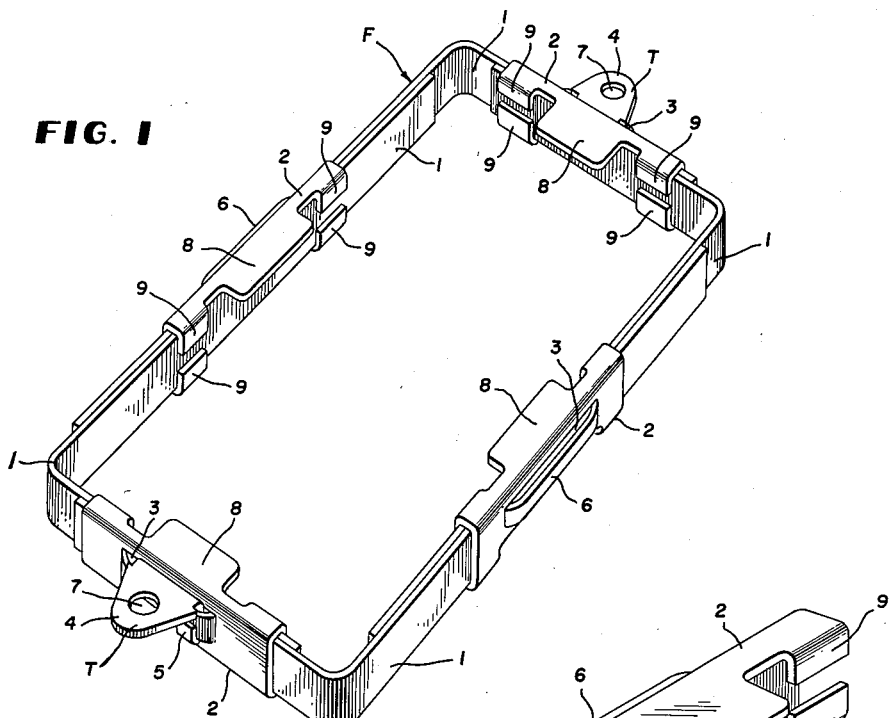
Fig. 1 is a view in perspective of the adjustable hold-down device for batteries in its entire assembly, embodying the invention, ready for use.

Referring now to the drawing, angle sections 1, assembled as shown in Fig. 1 in slidable relation with the legs of adjacent sections overlapping, can be made to form a rectangular or square frame F of selected dimensions for surrounding a storage battery. The angle sections 1 are held in retaining position by clamps 2.

Fig. 4 is an outside view of clamp 2. Strap 6 forms a part of clamp 2 and extends outwardly from the normal plane of the outer face of the clamp 2 to form pocket 3. Plate 8 forming a part of the clamp 2 is at right angles with the outer face 10 of clamp 2.

As best shown in Fig. 3, an angle bracket 4 has a hole 7 in one branch of the angle while the other branch of the angle is provided with legs 5. Hole 7 accommodates an anchoring bolt in either top side up position as shown in Fig. 1 or top side down as shown in Fig. 4.

In the pockets 3 of selected clamps are angle bolting plates or brackets 4 shown in position and having a bifurcated portion defining legs 5 which may be bent upward against the outer face of pocket strap 6. Bolts can be placed through holes 7 on the angle bracket 4 to bolt the frame into a holding position over the battery. As the battery frame is bolted downward, plates 8 on clamps 2 compress downward on the rim and top of the battery, holding it in its sitting position. Tabs 9 of clamps 2 are compressed tightly against the angle sections 1 when the size of the adjustable frame is desired to become stabilized.

Figure 2:
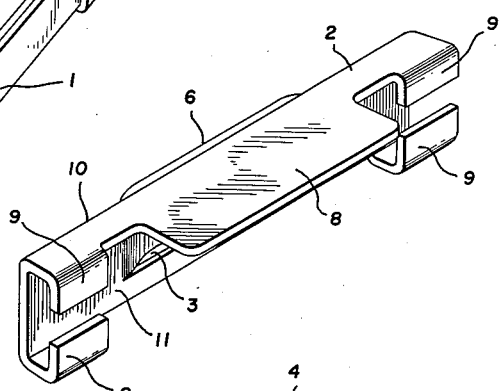
Fig. 2 is a view in perspective of the inner side of one of the retaining clamps of the angle sections showing its top plate for retaining the battery in holding position and on the outer face, showing a pocket or receptacle.

In Fig. 2, the clamp 2 is shown in its retaining position. Angle bracket 4 is shown in place for top-of-the-battery-level position in pocket 3 on clamps 2. Plate 8 is in position to provide downward pressure on a battery when a bolt is used in hole 7 with downward tightening of a nut on the bolt. Tabs 9 are left loose enough to permit adjustment of angle sections 1 and then compressed against angles 1 when desired to hold angle sections 1 stabilized.

Fig. 1 shows clamps 2 with angle brackets 4 assembled in the pockets 3 of clamp 2 with the top side up. The angle plates 4 may be assembled with legs 5 downward. If desired, as shown in dotted lines, the legs 5 may be bent upward to retain the angles 4 in position. Hole 7 in bracket 4 being near level with plate 8 of clamp 2.

Fig. 4 shows angle bracket 4 assembled top side downward, wherein the legs are assembled upward through pocket 3 and bent downward over pocket strap 6. Hole 7 and the top side are now assembled on a plane parallel with retainer plate 8 but considerably lower.

Although a certain specific embodiment of the invention has been shown and described, it is obvious that many modifications thereof are possible. The invention, therefore, is not to be restricted except insofar as is necessitated by the prior art and by the spirit of the appended claims.

That which is claimed as new is:

1. A device for holding batteries comprising a frame constructed of four angle sections having overlapping legs, clamping sleeves surrounding the overlapping legs, clamping tabs on said sleeves for tightly holding said overlapping legs in adjusted position, strap members struck from said sleeves to define pockets, a battery retaining flange projecting inwardly from each sleeve, and a pair of anchoring brackets having bifurcated plates inserted into the pockets of opposing sleeves, the legs of said bifurcated plates being bent to engage said pockets, said pocket being longer than the width of said plate so that said plate may be adjustably positioned therein.

2. A battery hold-down device comprising a plurality of strap members disposed in vertical planes and arranged to form a closed rectangle, each strap member having free end portions disposed in overlapping relation to adjacent like free end portions, means clampingly securing such overlapping end portions together so that the strap members encircle the upper extremity of an associated battery, at least one pair of such means being oppositely disposed with respect to each other and each including a vertical main body portion lying outside the respective overlapping free end portions of the associated strap members and each including an upper, inwardly projecting, horizontally disposed leg for overlying a top marginal edge portion of an associated battery to exert a downwardly directed holding force thereon, and means carried by each of such clamping means presenting an outwardly directed horizontal leg for receiving a hold-down bolt.

3. A battery hold-down device comprising a plurality of strap members disposed in vertical planes and arranged to form a closed rectangle, each strap member having free end portions disposed in overlapping relation to adjacent like free end portions, means clampingly securing such overlapping end portions together so that the strap members encircle the upper extremity of an associated battery, at least one pair of such means being oppositely disposed with respect to each other and each including a vertical main body portion lying outside the respective overlapping free end portions of the associated strap members and each including an upper, inwardly projecting, horizontally disposed leg for overlying a top marginal edge portion of an associated battery to exert a downwardly directed holding force thereon, and means carried by each of such clamping means presenting an outwardly directed horizontal leg for receiving a hold-down bolt, the last mentioned means comprising a generally L-shaped member having its vertically disposed portion secured to the clamping means, whereby said outwardly directed horizontal leg may be disposed at a level along the upper edge of said main body portion and at a level with the lower edge thereof, as desired.

4. A battery hold-down device comprising a series of L-shaped strap members adapted to encircle the upper marginal edge portion of an associated battery, each of said strap members having its free ends disposed in overlapping relation with the free ends of adjacent members, whereby a rectangular area enclosed by the strap members may be increased and decreased both widthwise and lengthwise thereof, a clamping device associated with each of such overlapping free end portions, whereby to permit of the stated adjustment of the strap members, each clamping device having an outwardly struck strap portion thereon to define a slot, an anchoring member associated with at least one pair of oppositely disposed clamping members, each said anchoring members being formed of flat strip of L-shaped configuration having a vertically extending strip portion received in an associated slot in one of the clamping members and being in face-to-face contact with the strap portion thereof and being of a height greater than the height of the outwardly struck strap portion and also including an outwardly directed horizontal leg portion of strip form apertured for the reception of a hold-down bolt and engaging one edge of the outwardly struck strap portion, the remote extremity of the vertical strip portion in each case being deformed outwardly to engage against the opposite side of the outwardly struck starp portion, and means carried by said hold-down device for engaging the top of the associated battery.

5. In a battery hold-down device, a clamping member comprising a main body portion of generally rectangular configuration having lower edge portions deformed laterally and then upwardly with respect thereto to form an upwardly facing channel construction, said main body portion having upper marginal edge portions laterally and then downwardly thereto to form a downwardly facing channel construction adapted to cooperate with the upwardly facing channel construction for clampingly receiving overlapping ends of battery retaining straps, the upper marginal edge portion also having an intermediate portion extending laterally horizontally therefrom beyond the channel constructions so as to overlie and engage upon an upper surface portion of an associated battery, said main body portion being provided with a generally centrally disposed, outwardly struck portion of generally elongate rectangular form having its inner surface disposed in spaced relationship to the plane of the outer surface of said main body portion to define a pocket, an L-shaped anchoring member having a vertical leg received in said pocket and an outwardly projecting apertured leg engaging one side of the outwardly struck portion, the vertical leg being of a length greater than the height of the outwardly struck portion so as to project therebeyond for clamping over onto the outer face of the outwardly struck portion.

6. The assembly as defined by claim 5 wherein said pocket is of materially greater length than the width of said anchoring member, whereby the latter is adapted for limited positioning lengthwise with respect to said clamping member.

7. The assembly as defined by claim 5 wherein said channel forming portions are confined to extreme opposite end portions of the main body portion, whereby the same are generally in the form of relatively small tabs easily deformable into strap clamping relationship.

8. The assembly as defined in claim 5 wherein the free end portion of said vertical leg is bifurcated to present individual, relatively small tabs for deformation over the outwardly struck portion.

References Cited in the file of this patent

UNITED STATES PATENTS

| 1,867,735 | Dunzweiler | July 19, 1932 |
| 2,216,663 | Fogle | Oct. 1, 1940 |
| 2,451,532 | Brown | Oct. 19, 1948 |